United States Patent [19]

Kiizumi

[11] 3,736,700
[45] June 5, 1973

[54] CAR TRACK
[75] Inventor: Rikihachiro Kiizumi, Tokyo, Japan
[73] Assignee: Cosmo Toys Manufactory Limited, Taikoktsiu, Kowloon, Hong Kong
[22] Filed: Aug. 30, 1971
[21] Appl. No.: 176,004

[52] U.S. Cl. ............................................. 46/206
[51] Int. Cl. .......................................... A63h 17/00
[58] Field of Search ................... 46/202, 206, 211, 46/212; 272/1

[56] References Cited
UNITED STATES PATENTS

| | | | |
|---|---|---|---|
| 3,597,876 | 8/1971 | Haji | 46/206 |
| 2,794,296 | 6/1957 | Fields | 46/202 |

*Primary Examiner*—Louis G. Mancene
*Assistant Examiner*—J. Q. Lever
*Attorney*—William Anthony Drucker

[57] ABSTRACT

The invention provides a toy comprising a track adapted to support a wheeled vehicle and to guide it in a closed path, and a plurality of powered wheeled vehicles to run on said track, each vehicle being provided at its leading end with cam means adapted to coact with the cam means of another such vehicle, when they meet head-on, and cause the leading end of one vehicle to commence to ride up and over the leading end of the other vehicle, the vehicles being shaped such that said one vehicle may ride completely over said other vehicle and down onto the track.

4 Claims, 3 Drawing Figures

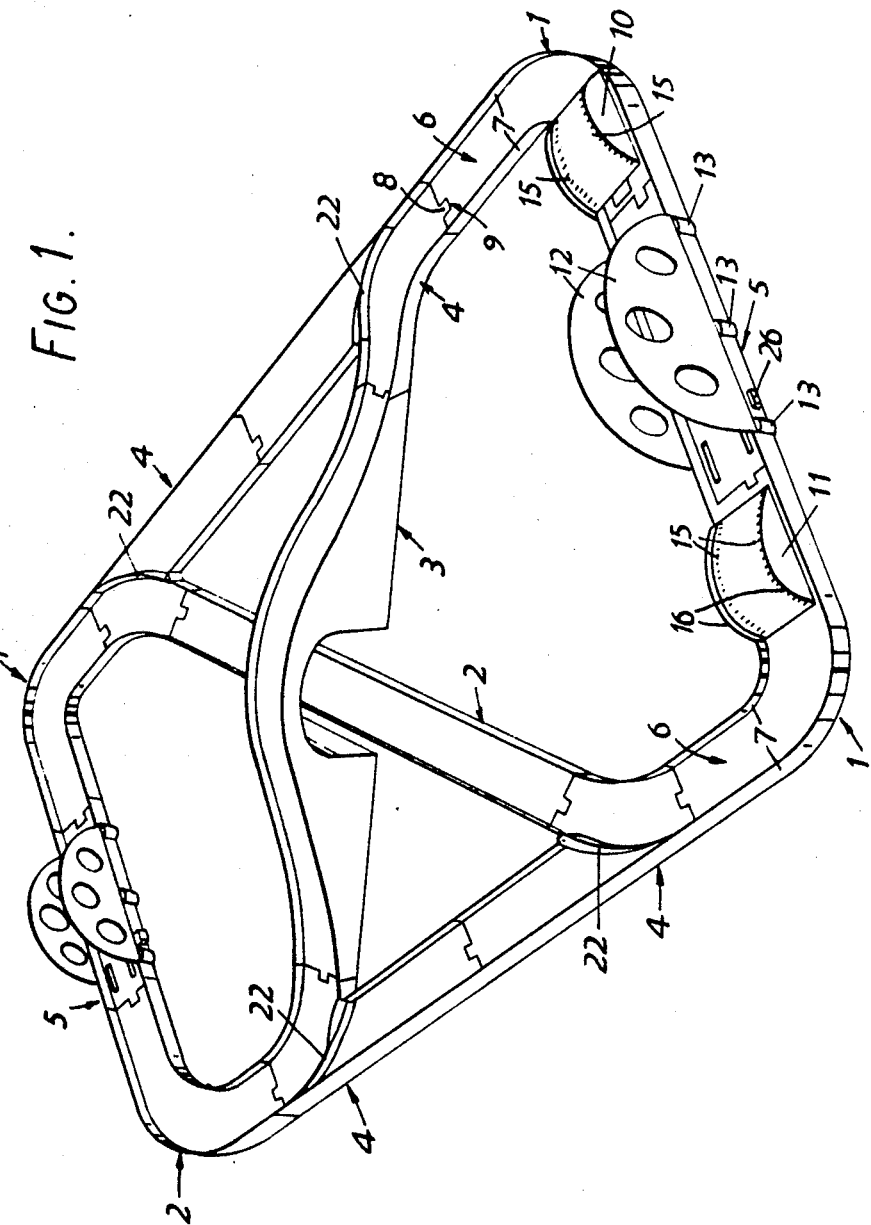

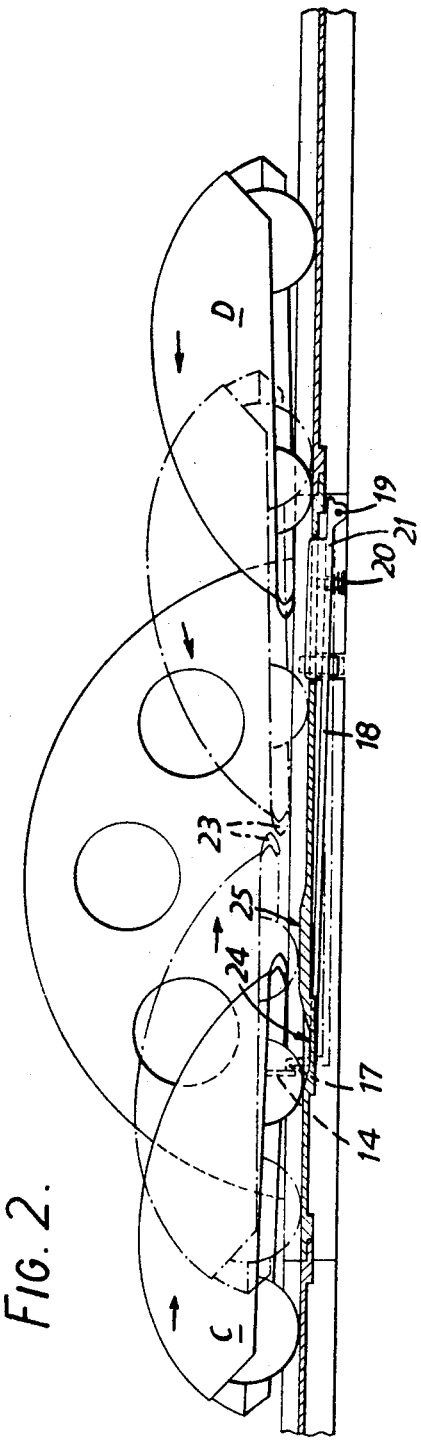
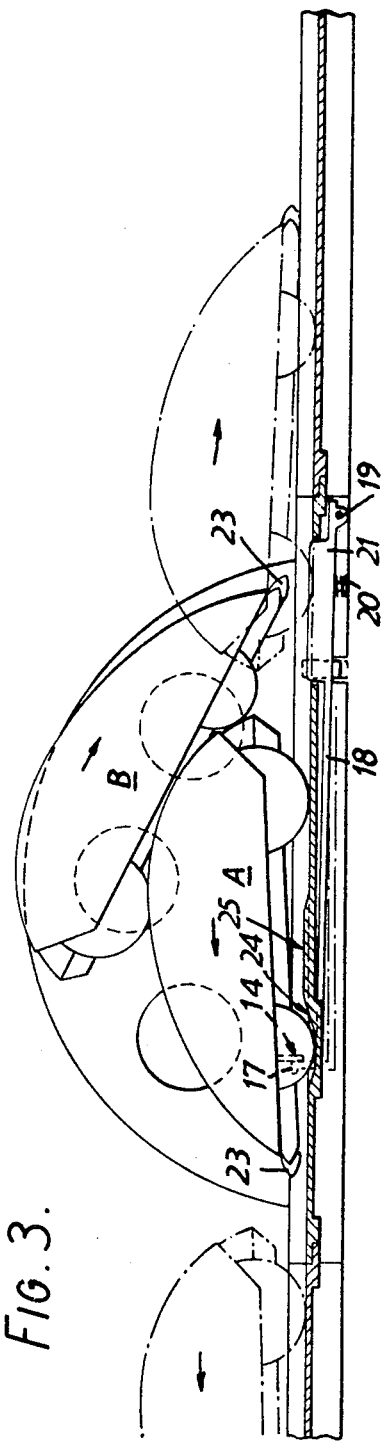

CAR TRACK

This invention relates to a toy with a track and wheeled vehicles, its object being to provide an improved construction in which, when two vehicles meet head-on, one vehicle may ride completely over the other vehicle and down again onto the track.

According to the present invention a toy comprises a track adapted to support a wheeled vehicle and to guide it in a closed path, and two or more powered wheeled vehicles to run on said track, each vehicle being provided at its leading end with cam means adapted to coact with the cam means of the other or another such vehicle, when they meet head-on, and cause the heading end of one vehicle to commence to ride up and over the leading end of the other vehicle, the vehicles being so shaped that said one vehicle may ride completely over said other vehicle and down onto the track. To assist in keeping the climbing vehicle in correct aligned position during the climbing-over operation, such vehicle is advantageously formed at its upper part with a supporting surface and with transversely spaced side walls to guide the wheels of the climbing vehicle contacting said supporting surface.

As so far described, the toy provides the simple function that, when the two vehicles meet at any point, one vehicle will ride up and over the other.

In a preferred embodiment, the track comprises a stop means having a raised position in which it projects above the level of the support surface of the track sufficiently to be engaged by a portion of a vehicle, to halt the vehicle. The stop means also has a lowered position in which it is withdrawn from engagement by the portion of the vehicle. Actuator means are positioned at a distance along the track from the stop means and are coupled thereto. The actuator means are positioned on the track so as to be abutted and moved by another vehicle and thereby lower the stop means to release the first vehicle. It is preferred to have the stop means urged by loading to rest in its raised position.

The track may further comprise, at a position thereon longitudinally between the stop means and the actuator means, (i) a depression to receive the front wheels of a vehicle and cause the cam means of that vehicle to be lowered in relation to the cam means of another vehicle approaching head-on, and/or (ii) a ramp to receive thereon the front wheels of a vehicle and cause the cam means of that vehicle to be raised in relation to the cam means of another vehicle approaching head-on. Both of such formations result in positive relative vertical shifting of the approaching pair of cam means, to ensure that one vehicle will always move in a predictable manner in relation to the other.

The track may be provided with deflectors which are movable, e.g. manually into each of two end positions for guiding a vehicle along a selected one of two alternative paths.

The track may advantageously be composed of portions having means whereby they can be secured releasably together.

In order that the nature of the invention may be readily ascertained, an embodiment in accordance therewith is now described with reference to the accompanying drawings, wherein:

FIG. 1 is a perspective view of a track, with two cars on it;

FIG. 2 is a vertical section of a part of the track, to show a first manner of operation of a braking device;

FIG. 3 is a vertical section of the same part of the track as in FIG. 2, to show a second manner of operation of the braking device.

The track shown in FIG. 1 has curved portions 1, straight portion 2, a bridge portion 3, branching-off portions 4, and braking portions 5. All of the portions have a running surface 6 defined between parallel side walls 7. The portions are secured releasably together by engagement of center tongues 8 of one portion in a center recess 9 of the neighboring portion, and by engagement of other tongues (not shown) spaced at each side of the center tongue 8, into undercut recesses at the underside of the neighboring portion. The whole forms a running track for two cars 10 and 11 which are adapted to crawl one over the other when they meet. On the braking portions 5 there are provided a pair of parallel-sided walls 12 having lugs which are releasably engaged in sockets 13.

Each car has four road wheels, and the two rear wheels are driven by an electric motor operated by a storage battery carried in the car and connected to the motor through an on-off switch having an operating lever 14 depending at the underside. The upper surface of each car is ribbed at 15 to provide a good grip for the rubber-tyred wheels of the other car, and has an upstanding ridge 16 at each side for guiding the wheels of the other car.

In each braking portion 5 there is provided a vertical stop lug 17 carried at one end of a horizontal lever 18 which is pivoted at 19 and lightly spring-loaded upwardly by a coiled spring 20. On the lever 18, adjacent to the pivot 19, there are provided two wheel pads 21 which are spaced, transversely of the track, so as to be contacted by the wheels of a car passing along the track. The stop lug 17 and the two wheel pads 21 protrude upwardly through respective slots in the track surface 6.

The branching-off portions 4 are each provided with a pivoted deflector blade 22 which can be set manually to divert a car along one or the other of the two arms of the track.

Each car has, on its leading end, a wedge-shaped cam 23, and whenever the two cars meet head-on, the cam 23 of one of the cars will ride up and over the cam of the other car, so that the one car will climb up and over the back of the other car.

If the two cars meet head-on whilst on any of the portions 1 to 4 of the track, one car will simply climb up and over the back of the other car, and the two cars will pass on their respective ways without stopping.

If one of the cars, marked "A" in FIG. 3 travels over the brake portions 5 it will arrive at a position in which its depending switch lever 14 hits against the raised stop lug 17, thereby halting the car with its front wheels in shallow depressions 24 of the track surface 6.

When the other car "B" arrives it meets car "A" head-on and the cam 23 of car "B" is higher than that of car "A" so that car "B" climbs up and over the back of car "A". When car "B" has passed completely over and again rests in a level position its rear wheels rest on the lugs 21 of the brake lever, thereby depressing the lever and moving the stop lug 17 downwardly until it disengages from the switch lever 14 of car "A". Both cars can thereafter proceed on their way.

Referring to FIG. 2, if car "C" arrives on a brake portion 5 in the direction of the arrow, its switch lever 14 contacts the stop lug 17 and the car is halted. When car "D" arrives, its front wheels pass onto the lugs 21 of the brake lever, causing the lever to be depressed and lowering the stop lug 17 to release car "C". The two cars then move towards each other and, at the time that they are about to meet, the front wheels of car "C" have run up shallow ramps 25 of the track surface 6, thereby lifting the front of the car and causing the cam 23 of car "C" to be higher than that of car "D", whereby car "C" will ride up and over the back of car "D".

The brake lever 18 of each brake portion 5 of the track has a lug 26 which projects laterally through the side wall of the track and which can be operated manually to depress the lever to release a car which may have been halted by the stop lug 17.

The operation is such that each time a car approaches a track portion 5, irrespective of the direction of travel, and is the first car to arrive there, it will be stopped in that position until the other car arrives, climbs over its back, and releases the brake. The last two functions occur in either order, depending upon the direction in which the first car approaches the brake portion 5. If the cars approach each other at any other location, one car will always climb over the other, and both cars will pass on their way uninterrupted.

I claim:

1. A toy comprising a track adapted to support a wheeled vehicle and to guide it in a closed path, a plurality of powered wheeled vehicles to run on said track, each vehicle being provided at its leading end with cam means adapted to coact with the cam means of another such vehicle, when they meet head-on, and cause the leading end of one vehicle to commence to ride up and over the leading end of the other vehicle, the vehicles being shaped such that said one vehicle may ride completely over said other vehicle and own onto the track, said track comprising stop means having a raised position in which it projects above the level of the support surface of the track sufficiently to be engaged by a portion of a vehicle, and a lowered position in which it is withdrawn from engagement by the portion of the vehicle, and actuator means and coupled thereto, said actuator means being positioned on the track so as to be abutted and moved by another vehicle and thereby lower the stop means to release the first vehicle.

2. A toy, as claimed in claim 1, wherein said stop means is urged by loading to rest in its raised position.

3. A toy, as claimed in claim 1, wherein the track comprises, at a position thereof longitudinally between the stop means and the actuator means, a depression to receive the front wheels of a vehicle and cause the cam means of that vehicle to be lowered in relation to the cam means of another vehicle approaching head-on.

4. A toy, as claimed in claim 1, wherein the track comprises, at a position thereon longitudinally between the stop means and the actuator means, a ramp to receive thereon the front wheels of a vehicle and cause the cam means of that vehicle to be raised in relation to the cam means of another vehicle approaching head-on.

* * * * *